Oct. 13, 1959 H. A. GOTTSCHALL ET AL 2,908,882
POTENTIOMETER
Filed March 28, 1958 2 Sheets-Sheet 2
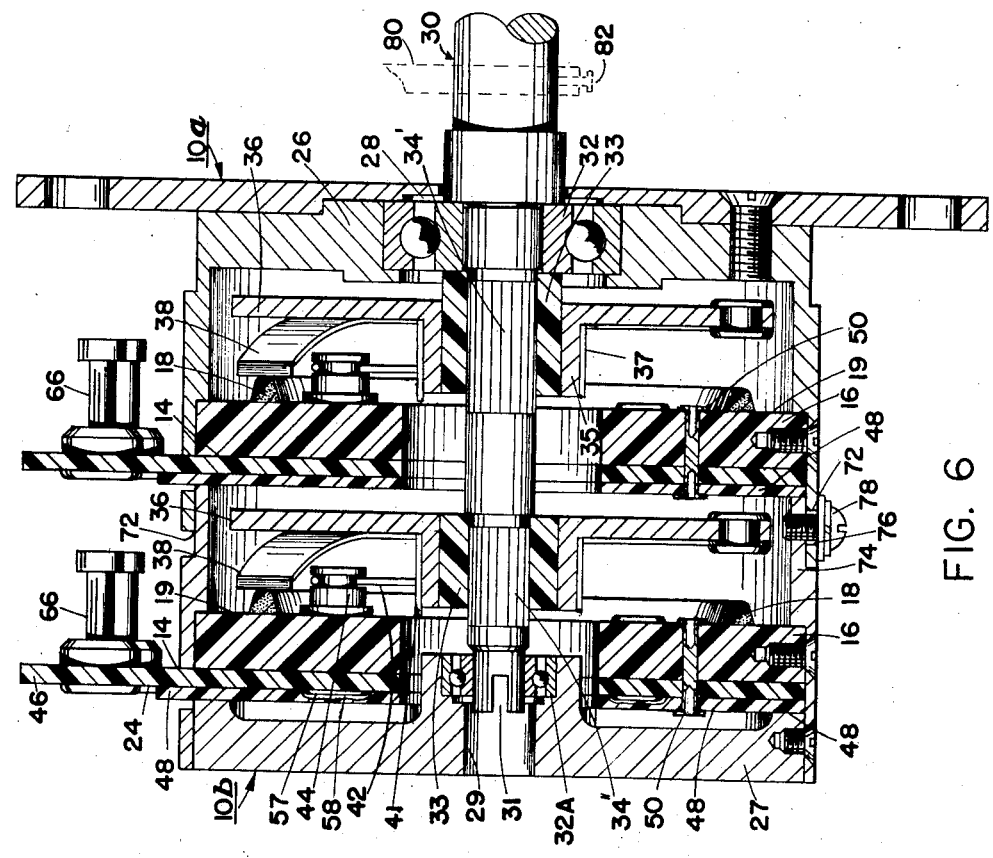
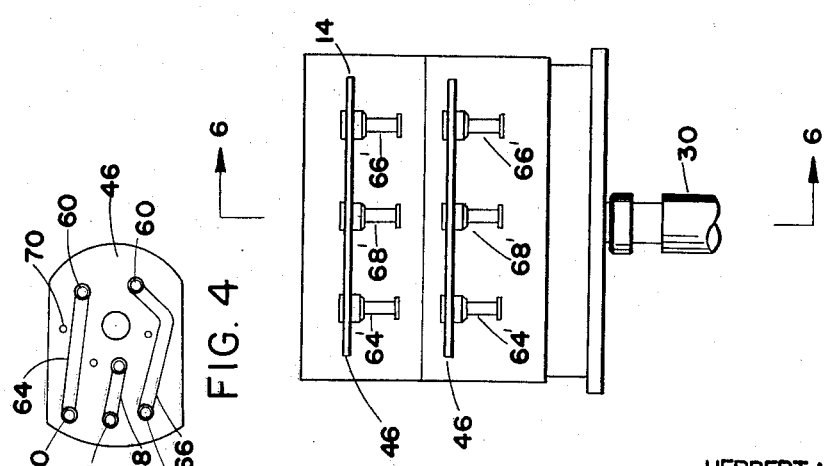
INVENTORS
HERBERT A. GOTTSCHALL
ARNOLD S. LOUIS
S. FREDERIC GUGGENHEIM
By Leonard H. King United States Patent Office 2,908,882
Patented Oct. 13, 1959

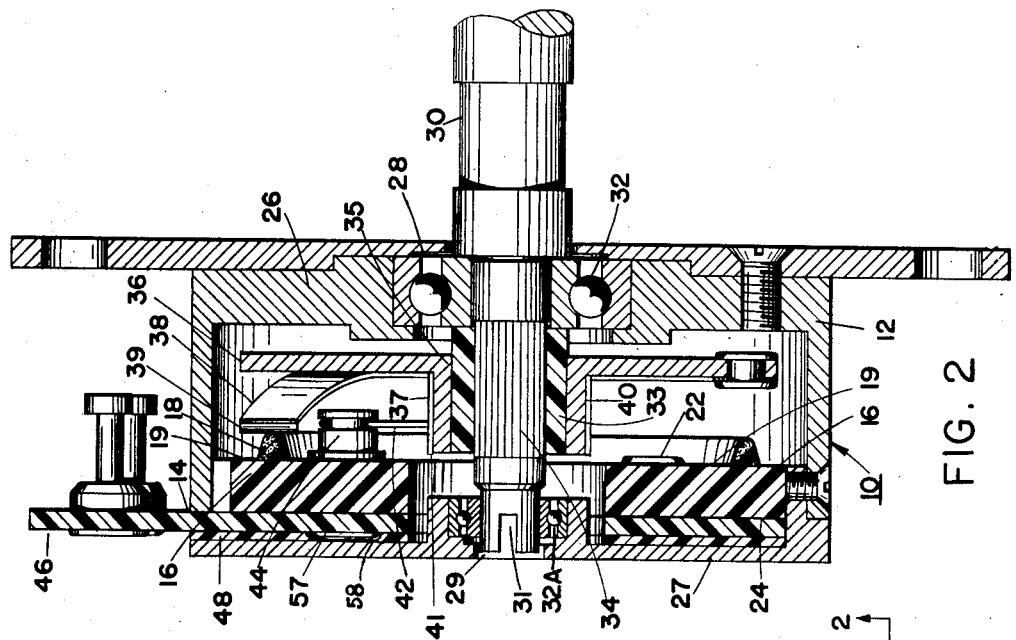
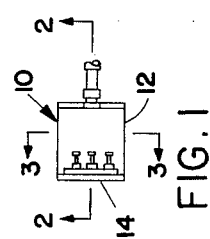
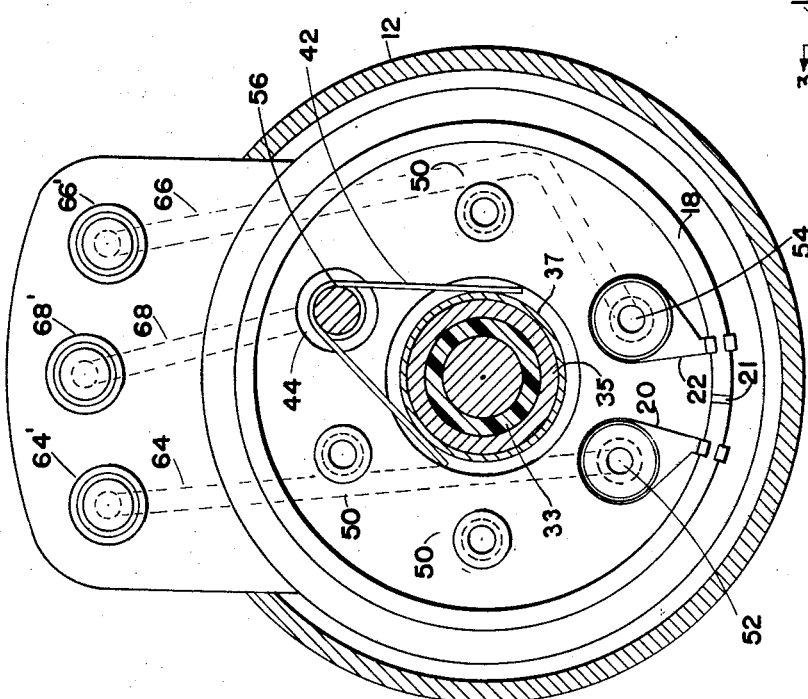

2,908,882

POTENTIOMETER

Herbert A. Gottschall, Nutley, N.J., Arnold S. Louis, Riverdale, N.Y., and S. Frederic Guggenheim, Teaneck, N.J.

Application March 28, 1958, Serial No. 724,548

4 Claims. (Cl. 338—131)

This invention relates to precision potentiometers adapted for use in applications requiring a high degree of precision and mechanical rigidity.

Precision potentiometers have a wide range of application, such as in computers, guided missiles and many other diverse fields. Frequently each different application involves a specialized design leading to high cost per unit. A mass-produced, low-cost unit, adapted to be used in different applications with little basic change in design, would make it possible to meet existing demands without the need for costly re-tooling and redesign for each individual application. The present invention contemplates a potentiometer that utilizes basic components that may be assembled to function as a precision variable-resistance or variable voltage unit in itself, or as part of an improved ganged potentiometer assembly. As will be hereinafter described in detail, the improved structure and novel arrangement of parts of the instant invention greatly simplify problems in manufacture and assembly, hence result in lower cost per unit.

A feature of the present invention is the provision for a precision potentiometer, adapted to be manufactured with maximum simplicity and ease of assembly.

Another feature of the present invention is an improved ganged potentiometer, having a relatively short overall length, and adapted to be easily assembled.

The present invention provides a ganged potentiometer having improved phasing means for the individual sections of this potentiometer with respect to the other sections, and in particular with respect to the physical angular position of the shaft in relation to external mechanical linkages whose position is to be monitored.

A principal advantage of this invention is the provision for improved circuit connecting means for a potentiometer, whereby circuits external to the potentiometer may be connected to the resistance element and take-off by a rigid self-supporting conductor assembly, thus avoiding a common source of potentiometer failure under missile flight conditions, such as short-circuiting or breakage of leads.

Further objects and advantages of the present invention will in part be pointed out and will in part be apparent from the following description and accompanying drawings.

In the drawings:

Figure 1 is a plan view of a single-unit potentiometer of this invention.

Figure 2 is a cross-sectional view, taken along line 2—2 of Figure 1.

Figure 3 is a cross-sectional view taken along line 3—3 of Figure 1.

Figure 4 is a back view of a terminal board incorporated in the device of this invention.

Figure 5 is a plan view of the present invention embodied in a ganged potentiometer assembly.

Figure 6 is a side view partially in cross-section, of the ganged potentiometer assembly, taken along lines 6—6 of Figure 5.

Referring now to the drawings, there is shown in Figure 1 a device of the present invention characterized generally by the numeral 10, comprising a cylindrical shell 12 having a transverse opening 14 formed near one end portion. In Figure 2 may be seen an insulator disc 16 which is disposed transversely within this shell near opening 14 and inwardly thereof. A circular resistance path 18 is formed on the inner face of disc 16. The present embodiment shows resistance path 18 as a raised track, formed of an electrically conductive plastic composition comolded with insulator plastic disc 16. An insulator plastic section 21 fills the gap between the ends of the resistance path 18 so as to permit 360° revolution of the wiper described hereinafter. Optionally, conventional stop means may be employed to limit the revolution of the wiper to a sector of less than 360°. Terminals 20 and 22 for this resistance path are formed on the disc 16, as best shown in Figure 3. Terminals 20 and 22 are placed in electrical connection with an external circuit by novel means more fully disclosed hereinafter.

A closure plate 26 is disposed at the end portion of shell 12 remote from disc 16. This closure plate may conveniently be formed integrally with cylindrical shell portion 12, to define a cup shaped member, as shown in Figure 2. A central aperture 28 is formed in this closure plate, and shaft 30 is axially disposed and rotatably mounted within the shell, with the free end of this shaft protruding from the closure plate through the central aperture. A second closure plate 27 is disposed at the end portion of shell 12 proximate to disc 16. A central aperture 29 may be formed in closure plate 27 providing access to slot 31 in shaft 30 for adjustment purposes, to be described in greater detail herein below. Shaft 30 may be conveniently mounted on ball-bearings 32—32a, carried by plates 26 and 27, as shown in Figure 2.

Shaft 30 is formed with a spline portion 34, over which is force-fitted insulator plastic sleeve 33. Metal hub 35 is in turn force-fit onto plastic sleeve 33. A preferred material for hub 35 is stainless steel and when this metal is employed, a close fitting coin silver sleeve 37 is slipped over hub 35 and is soldered thereto to provide a low noise contact making surface. A collector plate 36 extends outwardly from hub 35. For structural reasons it is preferable to machine hub 35 and collector plate 36 as a one piece member from a solid piece of stock.

It will be seen from Figure 2 that plate 36 is rotatable by shaft 30. Plate 36 is disposed close to, and confronting inner face 19 of insulator disc 16.

A resilient contact arm 38 is mounted on collector plate 36 and carries a precious metal contact member 39, which is adapted to wipe resistance path 18 as the collector plate is rotated. Arm 38 is in electrical connection with hub portion 35. A low resistance take-off means 42 is mounted on inner face 19 of the disc, and is adapted to wipe against sleeve 37 of hub portion 35.

As shown in Figure 3, take-off means 42 comprises a precious metal hairpin shaped resilient wire member, approximately 0.008" in diameter, mounted on base 44. The legs of the "hairpin" are tensioned against opposite sides of cylindrical hub portion 35. This construction has been found to introduce extremely low torque, which is an important advantage when the apparatus is used in applications requiring a low torque sensing device. Projection 41 extending from hub 35 spreads the legs of the hairpin when shaft 30 is oscillated back and forth during assembly.

A feature of this invention is the provision for novel connecting means whereby terminals 20 and 22 are brought out to the exterior of the unit. As shown in Figure 4, a flat strip of insulator material 46 abuts the outer face of disc member 16. Strip 46 may conveniently be formed of epoxy resin sheet filled with glass fibre. Abutting the outer face of strip 46 there is disposed a second insulator disc 48, the juxtaposition of disc 16, strip 46 and disc 48 defining a laminated structure. This structure is mechanically clamped together by rivets 50 passed transversely through these three elements to form a rigid integral structure. Registering apertures are formed in these elements to accommodate shaft 30, passed therethrough.

In addition, strip 46 is joined to disc 16 by three rivet-like connectors, 52, 54 and 56, which are primarily electrical conductive elements, but which also impart a mechanical support between strip 46 and disc 16. The head portions 57 of these connectors are disposed in recesses 58 formed in insulator disc 48 (see Figure 2) and abut closely on the outer surface of strip 46 so as to contact the electrically conductive paths 64, 66 and 68. The body portion of these connectors passes transversely through openings 60 (as shown in Figure 4) in strip 46 and corresponding openings in disc 16, where connector 52 is joined to terminal 20, connector 54 to terminal 22, and connector 56 to the base 44 of take-off member 42, respectively (see Figures 2 and 3).

Electrical conductive paths 64, 66 and 68 are formed on the outer face of strip 46 preferably by printed circuit means, whereby these conductive paths form a very thin layer of metal deposited on the strip, in the neighborhood of 0.005 of an inch of thickness, and of a width of about one-eighth of an inch. These paths are shown in Figure 3 in outline, and appear as a mirror image in Figure 4 as now viewed from the other side of flat strip 46. As shown in Figure 3 they are disposed in spaced relationship to make electrical contact with connectors 52, 54 and 56 respectively. Apertures 70 are formed on this strip to permit passage of rivets 50 therethrough, as stated previously.

It will be noted from Figure 4 that the aforementioned conductive paths on strip 46 are continued around the rim portion of apertures 60, to provide adequate area for electrical connection with the aforesaid connectors, which abut closely thereon. The conductive paths may be "inlaid" or laminated between layers of insulator plastic except at the rim portions surrounding apertures 60. The use of such inlaid circuits would eliminate the need for insulator members 48.

Conductive paths 64, 66 and 68 are brought out to external connectors 64', 66' and 68' respectively, whereby external circuit connections can be made. The connectors 64', 66', 68', 52, 54 and 56 are preferably soldered to the conductive paths.

It should be noted that the use of terminal strip 46 provides a compact sturdy device whereby connections to the unit can be made from the side of the casing, thus readily adapting the unit to be used in ganged potentiometer applications, wherein a single shaft rotates a plurality of potentiometer units. Further, there has been eliminated the conventional wire leads which are subject to breakage and shorting.

Assembly of this potentiometer has proven much less time-consuming than prior approaches utilizing leads which have to be formed around terminal posts and then soldered. Perhaps the most significant advantage has been increased reliability of connections and the elimination of a major ground of rejection in production. Also to be noted is that an integral laminated structure formed by insulator discs 16 and 48, and strip 46, can readily be manufactured.

In many applications for precision potentiometers, it is important that positive phasing means be provided wherein precision adjustments can be made so that a specific voltage output of the potentiometer will correspond to a specific angular position of the shaft. This is provided for in the present invention by extending portions of cylindrical shell 12 to define overlapping portions as shown in Figure 6, where a ganged potentiometer comprising sections 10a and 10b is illustrated. These extensions are formed in off-set relationship whereby end portion 72 of standard unit 10a will mate with and overlap adjoining end portion 74 of second standard unit 10b. Thus a rather tight, frictional fit is attained, enabling one unit to be rotated relative to the connected unit in a ganged potentiometer assembly. A transverse slot 76 is formed in end portion 72. A screw 78 mounted on portion 74, is positioned in slot 76, and is adapted when tightened, to have the head of the screw bear against end portion 72 so as to lock the units in the desired adjustment position.

Slot 31 in the the end of shaft 30 permits phasing of the potentiometer with repect to other equipment to which it is coupled. For example, let it be assumed that it is specified that in a given piece of equipment an arm whose position is to be monitored is to be at its midpoint of travel when a given voltage is derived from the potentiometer. Then the installation procedure would be as follows: The wiper of the potentiometer would be set to produce the voltage output desired by rotating the shaft through slot 31. The actuating arm 80 (shown in phantom in Figure 6) would be set to the corresponding mechanical position, set screw 82 or other equivalent locking means would then be tightened to positively fix shaft 30 with respect to the actuating arm. The provision of the slotted shaft end readily facilitates this type of adjustment.

If the unit is of the dual potentiometer type as shown in Figure 6, then potentiometer 10a is adjusted in this fashion and the 10b unit is adjusted with relation to unit 10a through the phasing means as explained hereinbefore.

In assembling ganged potentiometer 10a—10b, a single shaft 30 is used to rotate the various potentiometer units. To facilitate the assembly of such a potentiometer, the present invention employs a stepped shaft (see Figure 6), having progressively narrower diameter splined portions 34' and 34" over which insulator sleeves 33 are force-fitted. A plurality of hubs 35 are in turn force-fitted over these cores, thus providing for rapid assembly of the unit.

There has thus been provided, in accordance with the present invention, a versatile potentiometer unit adapted to function as a precision variable resistor unit, also as part of an improved ganged potentiometer assembly. It should be particularly noted that the use of a printed circuit type of terminal strip assures maximum compactness and electrical shielding, and also facilitates assembly of a unit of minimal overall axial extent. It also permits the leads to be passed out of the unit transversely to the axis of assembly with minimum complexity.

Various changes and modifications may be made by those skilled in the art within the scope of the present invention without however departing from the spirit thereof.

What is claimed is:

1. A rotary potentiometer including a housing comprising a cylindrical shell provided with a transverse opening near one end thereof, a disc of insulator material disposed transversely within said shell near said opening and inwardly thereof, a rigid flat strip of insulator material disposed in close abutting relation to said disc and protruding from said shell through said opening, electrically conductive rivet means rigidly clamping said disc and said strip, said rivet means passing transversely through said strip and said disc, a resistance path disposed upon the inner face of said insulator disc, movable contact means adapted to wipe said resistance path, at least two terminal connections for said resistance path disposed on the said inner face of said disc, a further terminal connection for said movable contact means disposed on said inner face of said disc, said terminal connections for said resistance path and said takeoff means being in electrical connection with said electrically conductive rivets, electrically conductive paths laminated to and completely supported by said strip, said paths having a minimal thickness relative to width, connector lugs for said paths formed on said portion of said strip exterior of said opening, wherein each of said paths is in electrical connection with one of said electrically conductive rivets and one of said connector lugs.

2. A first potentiometer unit as in claim 1, a second potentiometer unit, common shaft means for said first and second potentiometer units, each of said units being housed in a cylindrical shell, said cylindrical shell of said first unit having a first coupling portion, said second unit having a second coupling portion, said first and said second coupling portions having different diameters to provide a first portion offset in relation to a second coupling portion, the larger of said coupling portions being adapted to fit over the smaller in spaced registering relation, said larger offset portion having a transverse slot and said smaller offset portion having a threaded aperture visible through said slot when said units are in assembled relation, and at least one adjustable screw positioned in the aperture and adapted to releasably engage said first offset portion at a selected angle as said first unit is rotated relative to said second unit.

3. A rotary potentiometer including a housing comprising a cylindrical shell provided with a transverse opening near one end thereof, a disc of insulator material disposed transversely within said shell near said opening and inwardly thereof, an annular resistance path formed on the inner face of said disc, at least two terminal connections for said resistance path disposed on said disc, a centrally apertured closure plate disposed at the end of said shell remote from said disc, a shaft axially disposed and rotatably mounted within said shell, one end of said shaft protruding from said closure plate through the said aperture, a collector plate, means for rigidly supporting said collector plate electrically isolated from said shaft and rotatable thereby, said plate being disposed in confronting relation to the inner face of said disc, a flexible contact arm mounted on said collector plate and in electrical connection therewith and adapted to wipe said resistance path as said collector plate is rotated, flexible take-off means mounted on the inner face of said disc and adapted to wipe said collector plate, a take-off terminal connection disposed on said disc in electrical contact with said take-off means, a rigid flat strip of insulator material disposed in close abutting relation to said outer face of said disc and protruding from said shell through said transverse opening, the said terminal connections for said resistance path, and said take-off terminal connection being passed through said disc and through said strip to define riveting means clamping said disc and said strip, electrically conductive paths laminated to and completely supported by said strip, said paths having a minimal thickness relative to width, a plurality of terminal lugs disposed on a portion of the strip external to said casing, said paths being individually in electrical contact with one of said rivets and one of said terminal lugs.

4. A ganged multiple potentiometer, comprising a plurality of individual potentiometer units, each of said units including an annular resistance path and a wiper assembly for said resistance path, each of said wiper assemblies comprising a plastic sleeve member and collector means supported thereby, an actuator shaft adapted to mount said wiper assemblies, said shaft having stepped portions of progressively narrower diameter formed thereon, each of said stepped portions having splines formed thereon, the said plastic sleeve members being formed with varying internal diameters, each of said diameters registering with one of said diameters of said stepped portions of said shaft, whereby said wiper assemblies may be each individually mounted on the respective corresponding portion of said actuator shaft.

References Cited in the file of this patent

UNITED STATES PATENTS

| | | |
|---|---|---|
| 2,120,651 | Schellenger | June 14, 1938 |
| 2,240,565 | Marsten | May 6, 1941 |
| 2,255,132 | Stoekle | Sept. 9, 1941 |
| 2,401,037 | Arvin | May 28, 1946 |
| 2,592,392 | Canziani et al. | Apr. 8, 1952 |
| 2,632,830 | Aust et al. | Mar. 24, 1953 |
| 2,774,063 | Grinstead et al. | Dec. 11, 1956 |
| 2,791,666 | Daily et al. | May 7, 1957 |
| 2,811,620 | Mucher et al. | Oct. 29, 1957 |